(12) United States Patent
Hamilton

(10) Patent No.: US 10,704,236 B2
(45) Date of Patent: Jul. 7, 2020

(54) MULTI-USE RESERVOIR THAT CONSERVES AND ALLOWS REUSE OF WATER

(71) Applicant: Zachary James Hamilton, Boise, ID (US)

(72) Inventor: Zachary James Hamilton, Boise, ID (US)

(*) Notice: Subject to any disclaimer, the term of this patent is extended or adjusted under 35 U.S.C. 154(b) by 138 days.

(21) Appl. No.: 15/890,251

(22) Filed: Feb. 6, 2018

(65) Prior Publication Data

US 2019/0242096 A1     Aug. 8, 2019

(51) Int. Cl.
| | | |
|---|---|---|
| *E03B 1/04* | (2006.01) | |
| *B05B 1/18* | (2006.01) | |
| *G01K 13/02* | (2006.01) | |
| *A47K 3/28* | (2006.01) | |
| *E03B 7/04* | (2006.01) | |
| *E03C 1/04* | (2006.01) | |

(52) U.S. Cl.
CPC .............. *E03B 1/048* (2013.01); *A47K 3/281* (2013.01); *B05B 1/185* (2013.01); *E03B 7/045* (2013.01); *G01K 13/02* (2013.01); *E03C 2001/0418* (2013.01); *G01K 2013/026* (2013.01)

(58) Field of Classification Search
CPC .... E03C 2001/0418; E03B 1/048; E03B 1/18; A47K 3/281; G01K 2013/026; G01K 13/02; B05B 1/185; B05B 1/18
See application file for complete search history.

(56) References Cited

U.S. PATENT DOCUMENTS

2008/0141455 A1* 6/2008 Harrison ................... E03B 1/04
                                                                    4/665
2017/0130432 A1* 5/2017 Searcy ................... G01K 13/02

* cited by examiner

*Primary Examiner* — P. Macade Nichols
(74) *Attorney, Agent, or Firm* — Perkins Coie LLP

(57) ABSTRACT

Methods, systems, and devices are disclosed for implementing a water saving mechanism. In one aspect, a reservoir is provided to collect cold water while hot water is being heated. Once a desired temperature is reached, a valve is actuated to allow water to bypass the reservoir and be dispensed through a shower head. The reservoir can be used to dispense the cold water at a later time.

17 Claims, 13 Drawing Sheets

MULTI-USE RESERVOIR THAT CONSERVES AND ALLOWS REUSE OF WATER

TECHNICAL FIELD

This disclosure relates to systems, devices, and processes for water conservation and reuse.

BACKGROUND

Conventional warm or hot water dispensing systems may allow cool or cold water to flow from a fixture for a period of time after the user adjusts the fixture to dispense warm or hot water. In some scenarios, the fixture dispenses cool or cold water while a user waits for the desired warm or hot water to come out of the fixture. This may occur while cold or cool water incidentally stored in pipes between the fixture and the hot water heater or storage device is dispensed. In other scenarios, this occurs until a hot water heater may heat water supplied to the fixture to a desired temperature, or until the hot water storage is replenished. These scenarios and others cause considerable waste, as cold or cool water goes down the drain while the user waits for warmer or hot water to be dispensed from the fixture. Water waste is undesirable. This is pronounced in certain situations where water is scarce, such as at a campsite. What is needed are methods and systems for water conservation and reuse.

SUMMARY

Techniques, systems, and devices are disclosed for implementing systems and methods for saving water. The subject matter described in this patent document can be implemented in a variety of specific ways that provide one or more of the following features.

For example, provided is a system comprising a water reservoir having an opening that is configured to be attachable to an output of a valve and is configured to receive water, the valve having at least one input to receive water and two selectable outputs that allow water to flow, the water reservoir being configured to be attachable to an attachable water dispensing component to dispense the received water, wherein the valve has a temperature sensor that senses when a temperature of water flowing through the valve has risen above a certain temperature.

The valve selectively directs the flow of water from an input to one of the outputs. In an embodiment, the valve is configured to automatically change the input flow of water from a first output to a second output when the certain temperature of the water flowing through the input of the valve has been reached. In another embodiment, the valve is configured to be manually actuated to switch water flow from the input to one or more of its outputs.

In another embodiment, the temperature sensor provides a visual indication when a certain water temperature has been reached (for example, when a water temperature is above a threshold). In another embodiment, the temperature sensor provides a visual indication of temperature of water flowing through the valve.

In another embodiment, the attachable water dispensing component comprises a shower attachment. In another embodiment, the attachable water dispensing component comprises a water drinking spigot attachment. In another embodiment, the attachable water dispensing component comprises a plant watering attachment. In another embodiment, the attachable water dispensing component comprises a water transfer attachment. In another embodiment, the water reservoir is attachable to an RV vehicle and the attachable water dispensing component connects to the RV vehicle's water storage tank.

DETAILED DESCRIPTION

The disclosure provides techniques, systems, and devices that provide for water conservation and reuse. The disclosure provides a receptacle that can be attached to a shower. This receptacle can store water, and thus can be used to prevent cold water from going out of a shower head and down the drain while a person waits for hot water. A valve attached to the receptacle can selectively direct or divert the flow of water from a shower water source to a receptacle, or to a shower head. The valve also can switch the flow of water from the receptacle to the shower head when a certain input water temperature is reached. The valve switching can be triggered electronically at a certain temperature or can be manually actuated by a user, for example, upon the user receiving a notification that a certain water temperature has been reached. Water retained in the receptacle can later be used by using certain attachments to the water receptacle.

Figure 1:
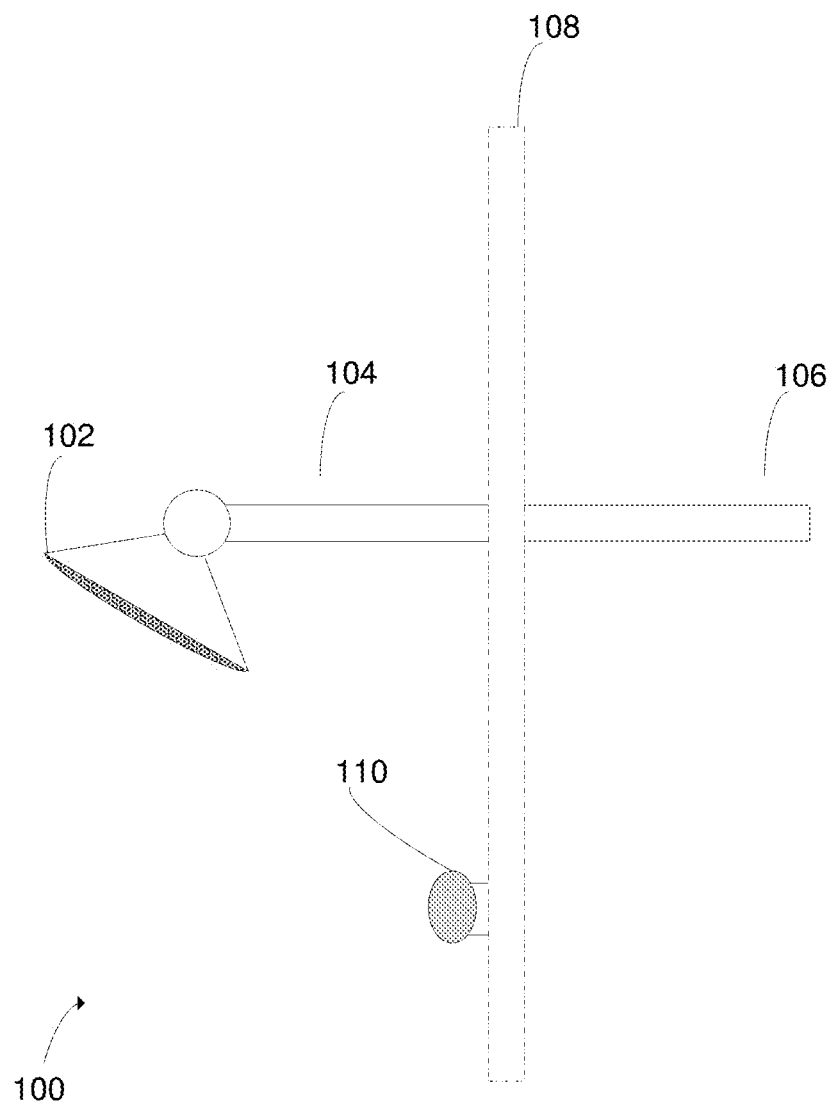
FIG. 1 illustrates an exemplary shower.

FIG. 1 illustrates an exemplary shower 100, a type of water fixture. The shower has a shower head 102 that outputs water. The shower head 102 connects to a pipe 104 or hose. The pipe 104 connects to internal plumbing 106 through a wall 108 to receive water from a shower water source (not shown). A knob 110 controls the water flow and temperature from the shower water source to the shower head 102. The knob 110 can be turned to provide hot or cold water through the shower head 102. Other types of shower water flow and water temperature controls are known in the art and may be used in place of or in combination with knob 110.

The shower 100 is exemplary and has been shown simply—it should be understood that the shower can have any number or types of connectors, knobs, hoses, brackets, shower heads, washers, etc. It should also be understood that multiple shower heads can be used, and the shower heads can be mounted or handheld.

It should also be understood that the shower 100 is not restricted to a home. The shower 100 can be included in a vehicle, such as an RV camper, or a portable camp shower.

Figure 2:
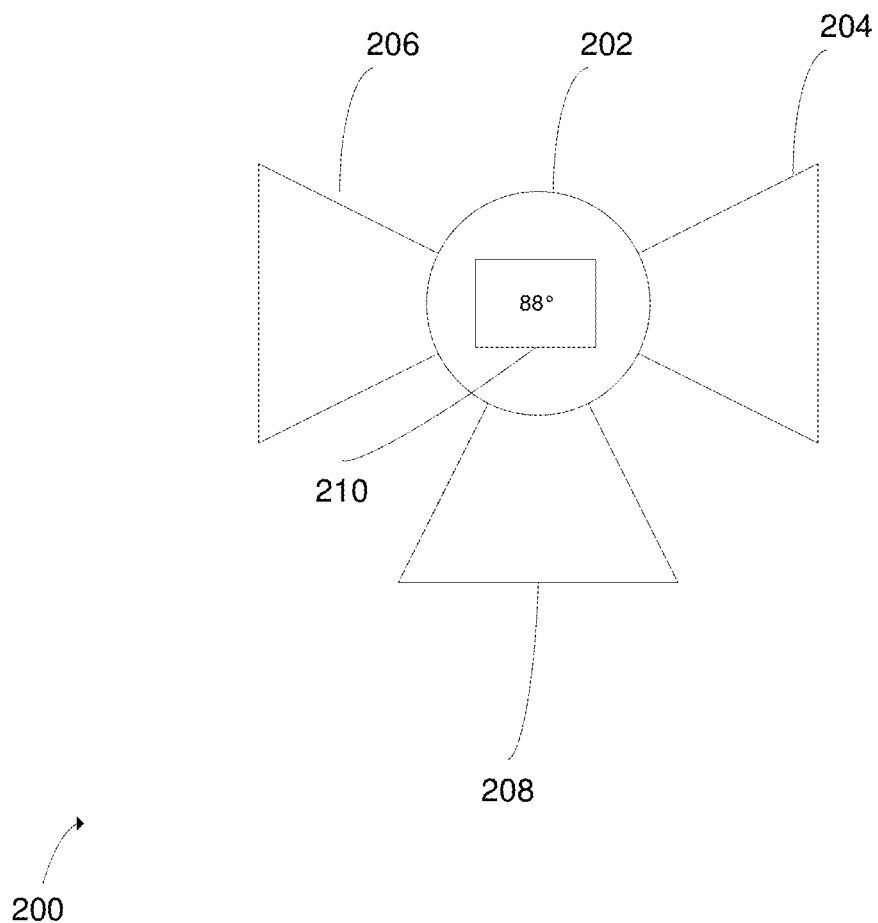
FIG. 2 illustrates an exemplary water flow diverter.

FIG. 2 illustrates an exemplary valve, a water flow diverter 200. The water flow diverter 200 has a switch 202, an input 204, and two separate outputs 206/208. The switch 202 of the water flow diverter 200 can be used to direct water flow from input 204 to output 206 or, alternatively, from input 204 to output 208. It should be understood that switch 202 can be electrically or mechanically actuated to change the water flow to either of the outputs 206 or 208. It should also be understood that any number of outputs can be provided.

Water flow diverter 200 has a temperature sensor 210. The temperature sensor 210 detects the temperature of water received at the input 204. The temperature sensor 210 can be used to trigger switch 202 to selectively divert flow of the flow diverter 200 from the input 204 to one of the outputs 206/208. For example, if the temperature sensor 210 detects the temperature of water received at the input 204 is below a threshold, the water flow diverter directs water from input 204 to output 208. In this example, if the temperature sensor 210 detects the temperature of water received at the input 204 is above a threshold, the water flow diverter directs water from input 204 to output 206.

The temperature sensor 210 can be electronic, and can trigger switch 202 at a certain predetermined temperature. In one embodiment, the predetermined temperature is fixed, and in other embodiments, the predetermined temperature is selectable by the user. In another embodiment, temperature sensor 210 can include temperature reactive powder which changes color to indicate to a person using the shower that a certain temperature has been reached. A person can then actuate the switch 202 to divert the flow of water. The temperature reactive powder can be a thermo-reactive powder, and can provide any color. In one embodiment, the temperature sensor 210 can display the current temperature to the user.

With reference to FIG. 1, in other embodiments, the temperature sensor 210 can be included on the arm 104 or hose, or any component of the shower 100. Regardless of the location of the temperature sensor 210, the sensor may still trigger switch 202 at a certain predetermined temperature or provide an indication to a user of the shower 100 to actuate the switch 202 to divert flow of water through the flow diverter 200.

Figure 3:
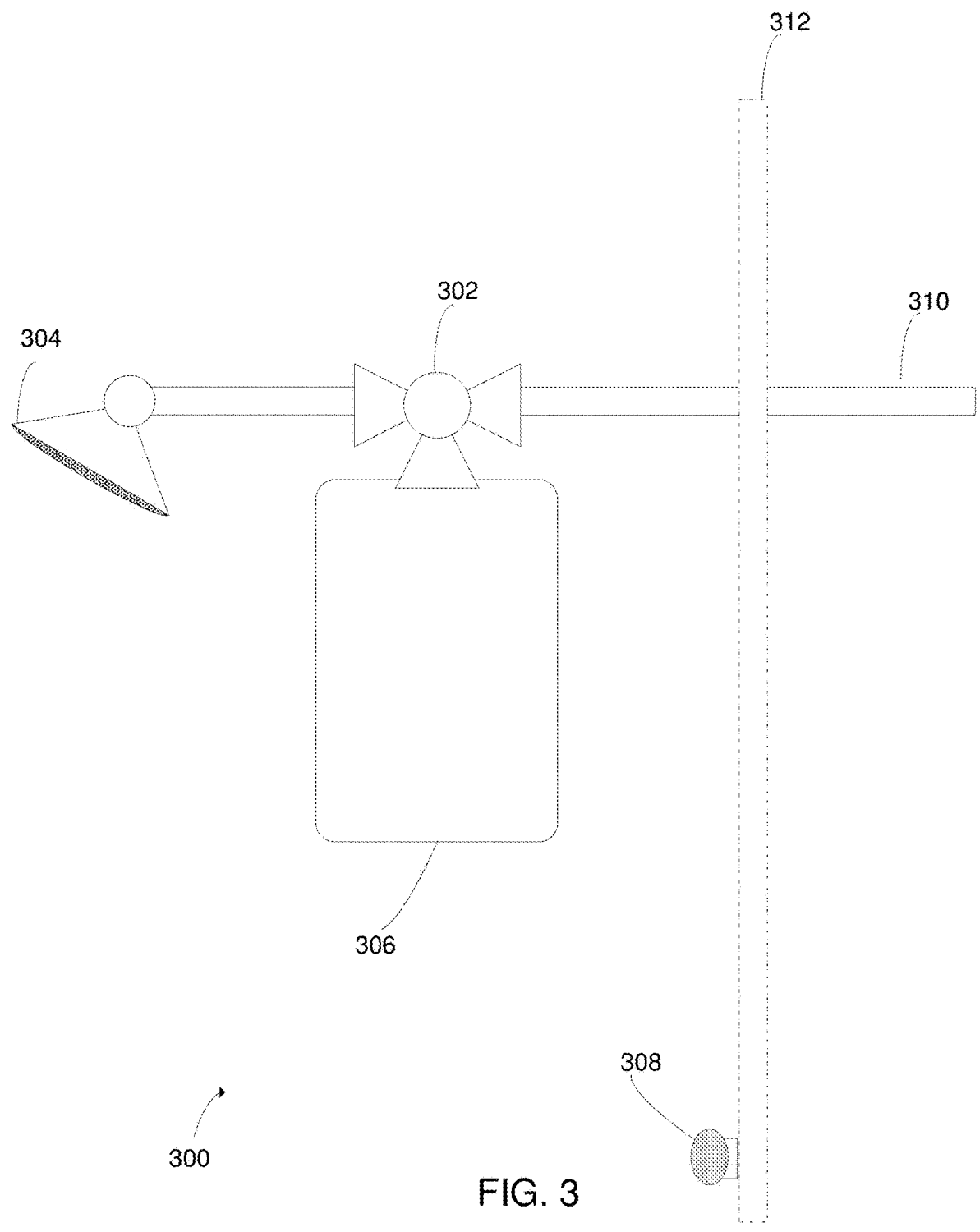
FIG. 3 illustrates an exemplary water saving shower system.

FIG. 3 illustrates an exemplary water saving shower system 300 where a flow diverter 302 is connected to a shower head 304 and a reservoir bag 306. The flow diverter 302 is used to selectively cause water to flow from internal plumbing 310 connected to a water source (not shown) to the shower head 304 or to the reservoir bag 306. A temperature sensor can be included within the flow diverter 302 to automatically switch the flow, at a certain predetermined temperature, to the shower head 304 or reservoir bag 306. The temperature sensor can provide a visual cue indicating to the user of the shower 300 that the user should manually change a switch on the flow diverter 302 to redirect the flow of water. In an embodiment, the visual cue occurs at 88 degrees Fahrenheit. In another embodiment, the temperature sensor provides the temperature of the water.

In an embodiment, a user of the shower begins their shower by turning on the shower via a knob 308 which begins the water flow from the internal plumbing 310 behind wall 312. The flow diverter 302 is initially be set to divert water flow to the reservoir bag 306. The reservoir bag 306 would then begin to fill with water as the water heater (not shown) heats water, or as cooler or cold water temporarily stored in internal plumbing 310 between the shower 300 and water heater while the shower was off passes through the system, allowing hotter water from the water heater to reach the shower 300. Once the temperature of water through the flow diverter 302 reaches a predetermined temperature (e.g., 88 degrees Fahrenheit), a user is provided with a visual cue. In an embodiment, the visual cue is provided by the color change of a reactive powder that is on the flow diverter 302 or any of the piping. It should be understood that the reactive powder is merely an exemplary embodiment—any method of providing a visual cue indicative of a temperature sensed via temperature sensor can be given, such as a digital temperature thermometer, or any other thermometer that shows a temperature in number, color, or any other indication, such as an LED light which illuminates when a sensed temperature is over a threshold. In another embodiment, the predetermined temperature at which a visual cue is provided is configurable.

In an embodiment, the flow diverter 302 provides an automatic diversion of water flow once a certain temperature is reached. The temperature of the water following to the reservoir bag 306 would be measured electronically or via other chemical means and, when a predetermined measured temperature was reached (such as when the water temperature increases to 88 degrees Fahrenheit), the flow diverter 302 would divert flow from the reservoir bag 306 to the shower head 304.

In an embodiment, the flow diverter 302 is configured to divert water to the reservoir bag 306 when the water flow is off. When a user turns on water, the flow diverter 302 is configured to initially direct flow to the reservoir bag 306 and, when a predetermined measured temperature is reached, the flow diverter 302 diverts flow to the shower head 304.

Based on the visual cue, the user can change the flow diverter 302 to deliver water to the shower head 304. Thereafter the shower system 300 operates like a normal shower and the user is able to bathe themselves.

Prior art systems allow for a considerable amount of water waste. Typically, a user of a shower turns on the shower and waits for the water coming out of the shower head to get hot (e.g., reach a desired temperature or temperature range) before starting to bathe using the shower, or in the case of a faucet, before washing her hands. This could take up to several minutes. Letting cold or cool water (e.g., water below a desired temperature or temperature range) run out of the plumbing fixture (showerhead or faucet) and go down the plumbing drain wastes a considerable amount of water. Collecting some or all of this cold water in the reservoir bag 306 prevents it from being wasted.

In an embodiment, the reservoir bag 306 is attachable and detachable from the flow diverter 302. The reservoir bag 306 can be screwed on or snapped on, or otherwise selectively fixed to the flow diverter 302 output. In yet another embodiment, the reservoir bag 306 is connected to the flow diverter 302 via a hose or pipe. In an embodiment, the flow diverter 302 is connected to an overflow protector (not shown). The overflow protector is configured to prevent the reservoir bag 306 from overflowing. When the reservoir bag 306 is filling up with water, and the water hits a predetermined threshold, the overflow protector switches the output of the flow diverter 302 from the reservoir bag 306 to the shower head 304. In this way, damage to the reservoir bag 306 is prevented. In another embodiment, the overflow protector shuts off water flow to all outputs when a predetermined fill threshold of the reservoir bag 306 is reached, preventing water from flowing to the shower head 304 and the reservoir bag 306, and preventing water pressure from damaging the reservoir bag 306. In this embodiment, the reservoir bag 306 that is full of water can be removed and another can be attached to the flow diverter 302. Water can then begin to flow to the replacement reservoir bag 306.

Figure 4:
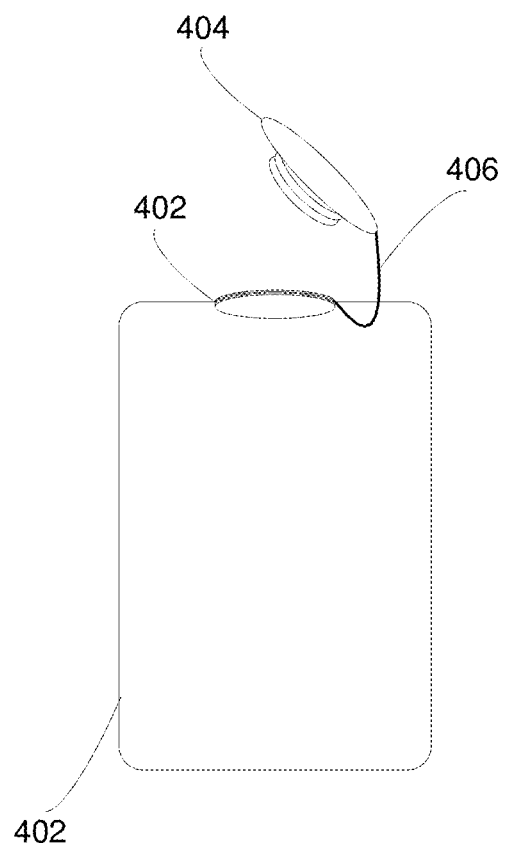
FIG. 4 illustrates an exemplary reservoir bag having an opening.

Shown in FIG. 4 is an exemplary reservoir bag 400 having an ingress opening 402. The ingress opening 402 allows water to flow to and from the reservoir bag 400. The ingress opening 402 connects to a flow diverter, such as the flow diverter 302 shown in FIG. 3. The ingress opening 402 can be screwed on, snapped on, or any other known method of attachment to a valve or pipe to collect water. The ingress opening 402 can also have a screw-able cap 404 to provide a seal and retain water in the reservoir bag 400 when the reservoir bag 400 is detached from a flow diverter. In an embodiment, the screw-able cap 404 has an attachment component 406 to keep the screw-able cap 404 to the reservoir bag 400 when it is not screwed onto the ingress opening 402. In an embodiment, the ingress opening 402 can have a snap-able cap. In yet another embodiment, the ingress opening 402 seals itself whenever it is detached from the flow diverter 302.

As mentioned, the reservoir bag 400 can be filled with water, and the water in the reservoir bag 400 can be reused. After the reservoir bag 400 is filled, it can be detached from the flow diverter. The reservoir bag 400 will then be sealed and stored, or immediately reused. Water can be accessed from opening 402.

Figure 5:
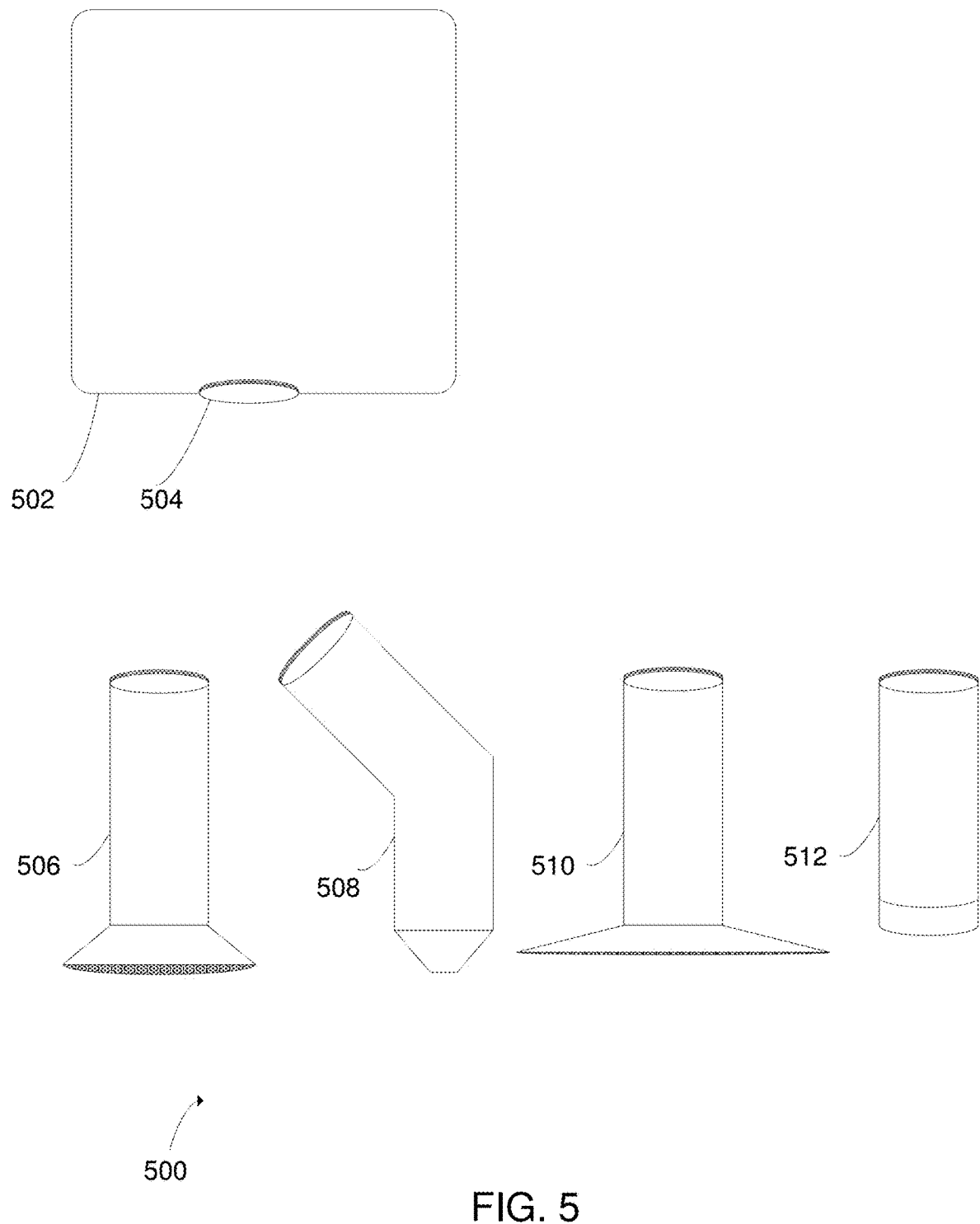
FIG. 5 illustrates an exemplary reservoir bag having an opening.

Shown in FIG. 5 is a reservoir bag system 500 having a reservoir bag 502 with an opening 504. Various attachments can be attached to the opening 504 to allow use of water within the reservoir bag 502. In an embodiment, the opening 504 can be attached to an outdoor shower attachment 506. The outdoor shower attachment 506 and the water in the reservoir bag 502 can be used by a person to shower. In another embodiment, the opening 504 can be attached to a drinking spigot 508 and later used for drinking. In another embodiment, the opening 504 can be attached to a plant watering attachment 510 where it can be used to water plants. In another embodiment, the opening 504 can be attached to another water repository via a transfer attachment 512, where it can be transferred. For example, the other water repository can be a RV camper water tank.

Figure 6:
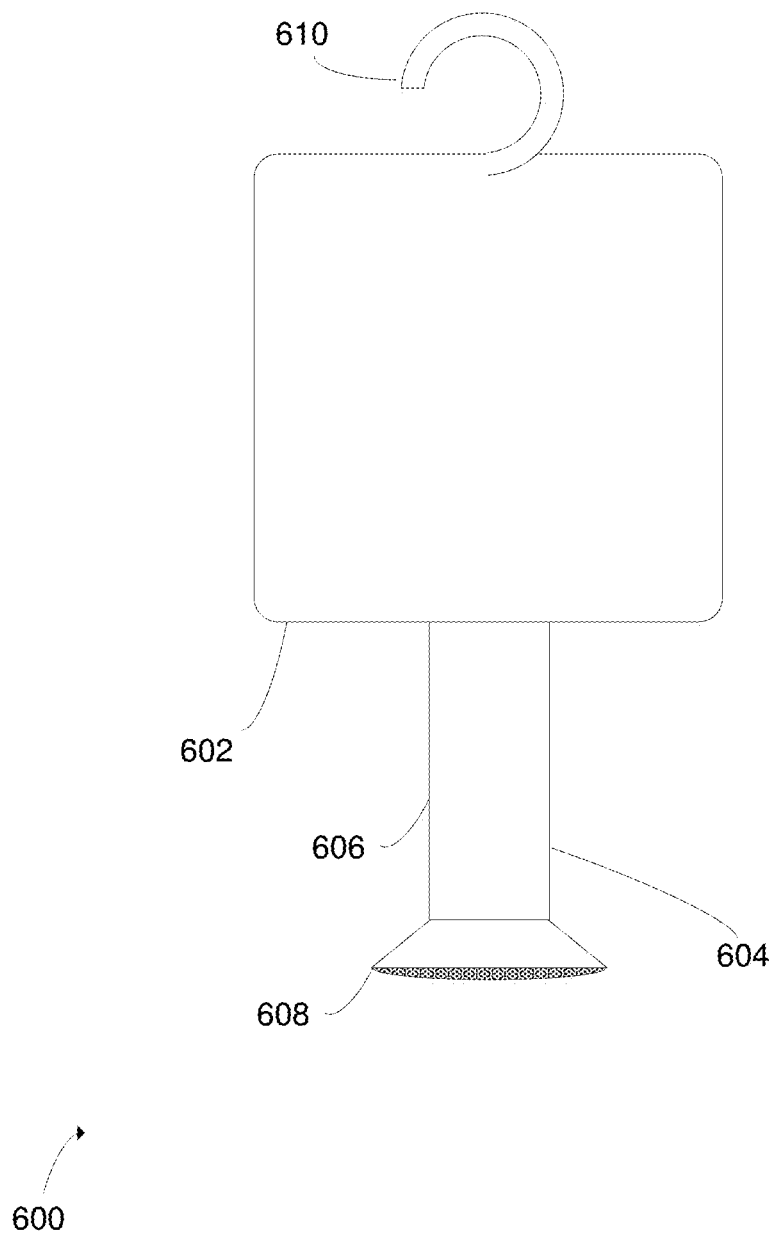
FIG. 6 illustrates an exemplary outdoor shower attachment.

Shown in FIG. 6 is an exemplary system with a shower attachment and reservoir bag 600. The system has a reservoir bag 602 with a shower attachment 604. The shower attachment 604 has tubing 606 that can be retracted from the reservoir bag to begin the dispensing of water retained in the reservoir bag through the water dispensing head 608. To stop water flow, the tubing 604 is pushed back into the reservoir bag. The reservoir bag can have a hook 610 or other attachment to hang it in an outdoor shower. It should be understood that the outdoor shower attachment 604 can be removably attachable, screwed in, snapped on, or fabricated onto a reservoir bag. It should also be understood that the tubing of the outdoor shower attachment 604 need not be retractable. In an embodiment, the tubing and the water dispensing head 608 of the outdoor shower attachment 604 includes a valve or switch to start and stop water flow.

Figure 7:
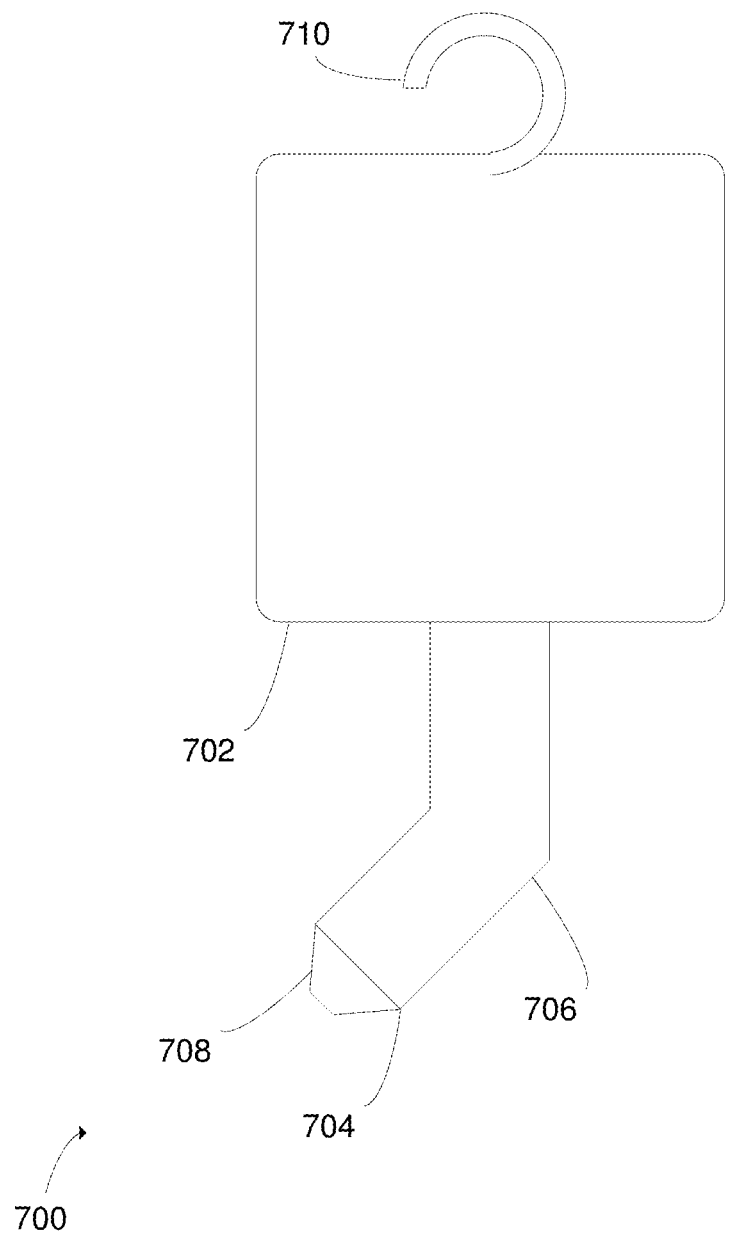
FIG. 7 illustrates an exemplary drinking spigot attachment.

Shown in FIG. 7 is an exemplary system 700 with a reservoir bag 702 with a drinking spigot attachment 704. The drinking spigot attachment 704 has tubing 706 and a water dispensing outlet 708. The tubing 706 of the drinking spigot attachment 704 can be retracted from the reservoir bag to begin the dispensing of water retained in the reservoir bag through the water dispensing outlet 708. To stop water flow, the tubing 706 can be pushed back into the reservoir bag. In another embodiment, any part of the tubing 706 or water dispensing outlet 708 can be squeezed to start the water flow. The reservoir bag can have a hook 710 or other attachment to hang it.

It should be understood that the drinking spigot attachment 704 can be removably attachable, screwed in, snapped on, or fabricated onto a reservoir bag. It should also be understood that the drinking spigot attachment 700 need not be retractable. In some embodiments, the drinking spigot attachment 704 includes a valve or switch to start and stop water flow.

In another embodiment, force is applied to the tubing 706 of the drinking spigot attachment 704 to begin water flow through the water dispensing outlet 708. When force is not applied, water stops flowing through the drinking spigot attachment 704.

Figure 8:
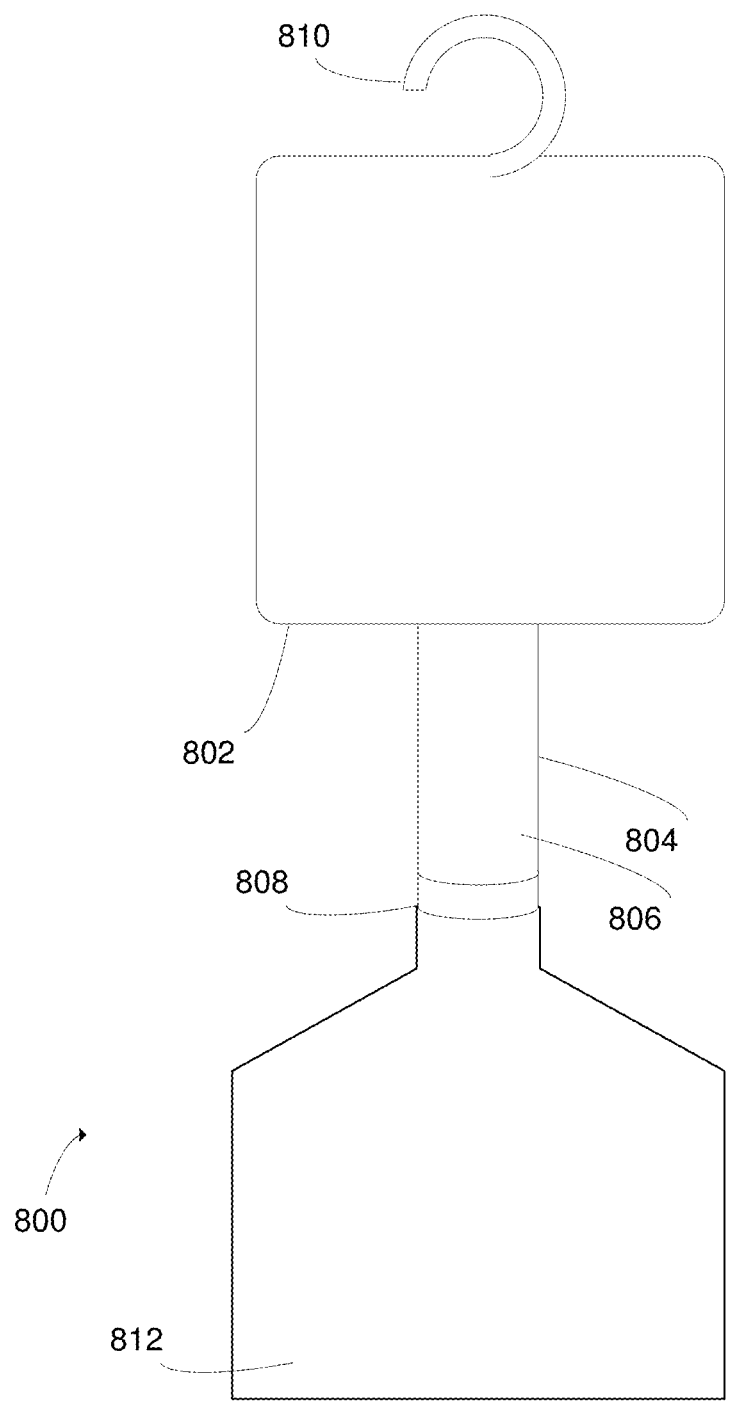
FIG. 8 illustrates an exemplary water transfer attachment.

Shown in FIG. 8 is an exemplary system 800 with a reservoir bag 802 attached to a water transfer attachment 804. The water transfer attachment 804 has tubing 806 and an attachment and dispensing portion 808. The reservoir bag 802 has a hook 810. The attachment and dispensing portion 808 connects to a water tank 812 or other type of reservoir. The attachment and dispensing portion 808 can be screwed or snapped on to the water tank 812 or other type of reservoir.

The tubing 806 of the water transfer attachment 804 can be retracted from the reservoir bag 802 to begin the dispensing of water retained in the reservoir bag 802 to the attachment and dispensing portion 808. To stop water flow, the tubing 806 is pushed back into the reservoir bag 802. It should be understood that the water transfer attachment 804 can be removably attachable, screwed in, snapped on, or fabricated onto a reservoir bag. It should also be understood that the outdoor shower attachment need not be retractable. In another embodiment, the outdoor shower attachment includes a valve or switch to start and stop water flow.

Figure 9:
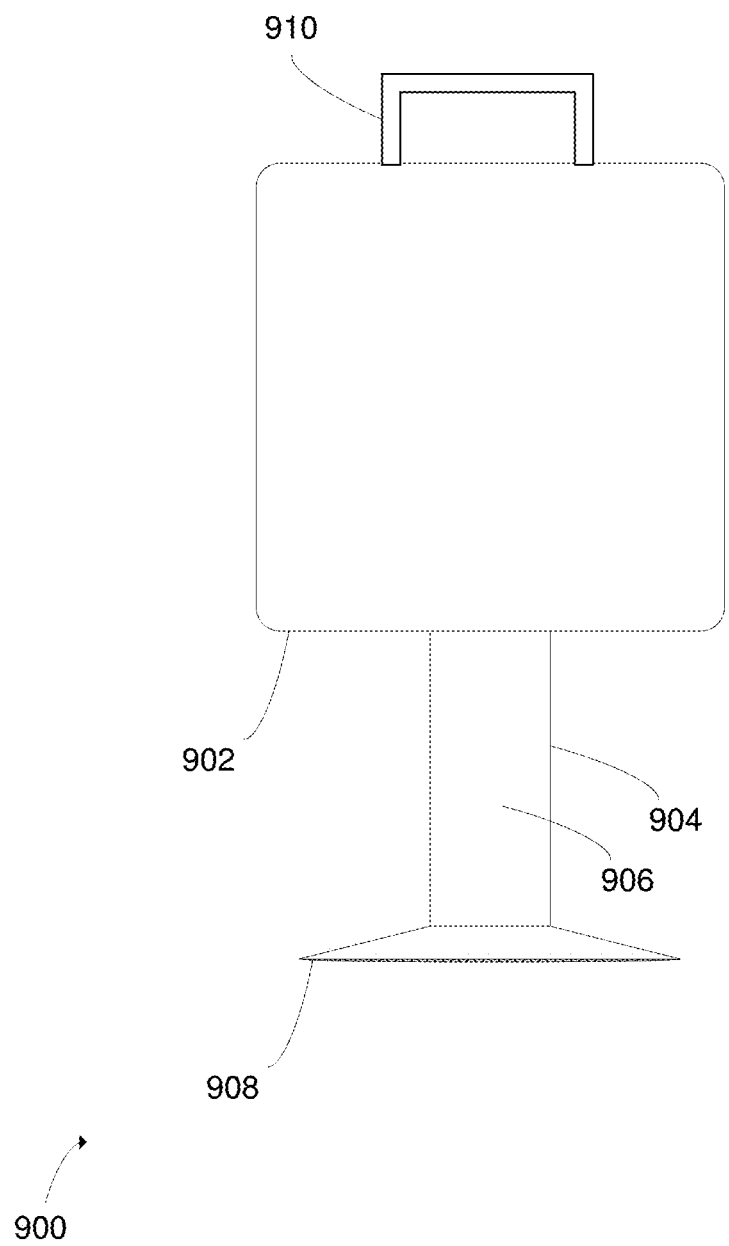
FIG. 9 illustrates an exemplary plant watering attachment.

Shown in FIG. 9 is an exemplary system 900 having a reservoir bag 902 attached to a plant watering attachment 904. The plant watering attachment 904 has tubing 906 and a water dispensing head 908. The tubing 906 of the plant watering attachment 902 can be retracted from the reservoir bag to begin the dispensing of water retained in the reservoir bag 902 through the water dispensing head 908. To stop water flow, the tubing 904 is pushed back into the reservoir bag 902. The reservoir bag 902 can have a handle 910. Handle 910 can be a removable attachment or fabricated onto the bag. It should be understood that the plant watering attachment 904 can be removably attachable, screwed in, snapped on, or fabricated onto a reservoir bag. It should also be understood that the outdoor shower attachment need not be retractable. In some embodiments, the outdoor shower attachment includes a valve or switch to start and stop water flow.

Figure 10:
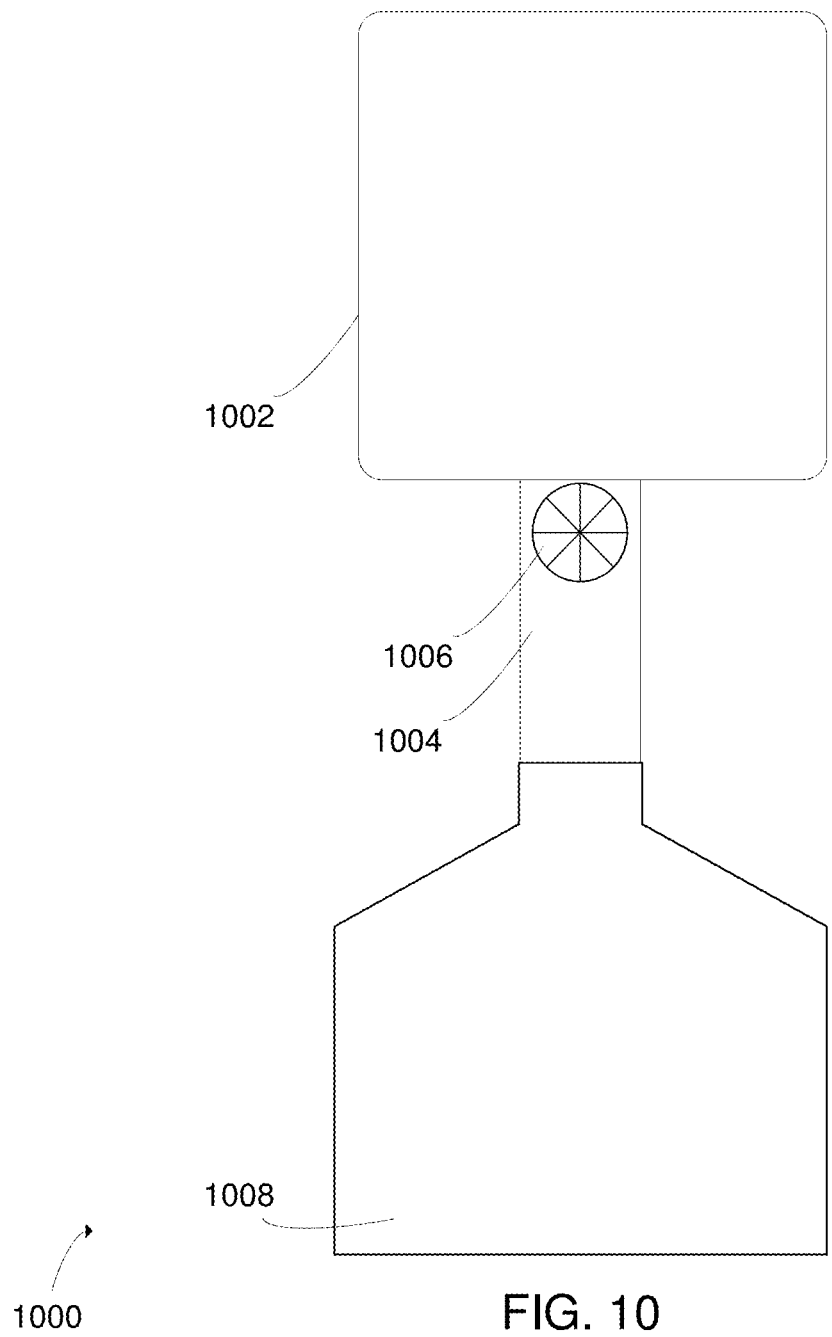
FIG. 10 illustrates an exemplary bag that is installed on an outdoor vehicle.

Shown in FIG. 10 is an exemplary system 1000 illustrating a reservoir bag 1002 attached to a water storage tank 1008 of an RV. The reservoir bag 1002 is connected to the water storage tank 1008 via a transfer attachment pipe 1004. In an embodiment, an attachment mechanism can be fabricated on the reservoir bag 1002 allowing it to be attached to an RV vehicle.

The transfer attachment pipe 1004 can be exposed or installed in a wall. The transfer attachment pipe 1004 can be removably attachable to the reservoir bag 1002 and to the water storage tank 1008. It should be understood that any method of attachment can be employed. Water flow can begin (and be shut off) to the water storage tank 1008 via a valve 1006.

In an embodiment, the exemplary system 1000 is placed on an RV vehicle (not shown). In this embodiment, the attachment pipe 1004 and valve 1006 are also attached to the RV vehicle. The water storage tank 1008 is the RV vehicle's water storage tank. In another embodiment, the pipe 1004 and valve 1006 can be attachable to an RV vehicle's water storage tank.

For the sake of simplicity, some internal plumbing components of the RV vehicle are not shown. It should be understood that any types of connectors, pipes, washers, etc. can be used.

Figure 11:
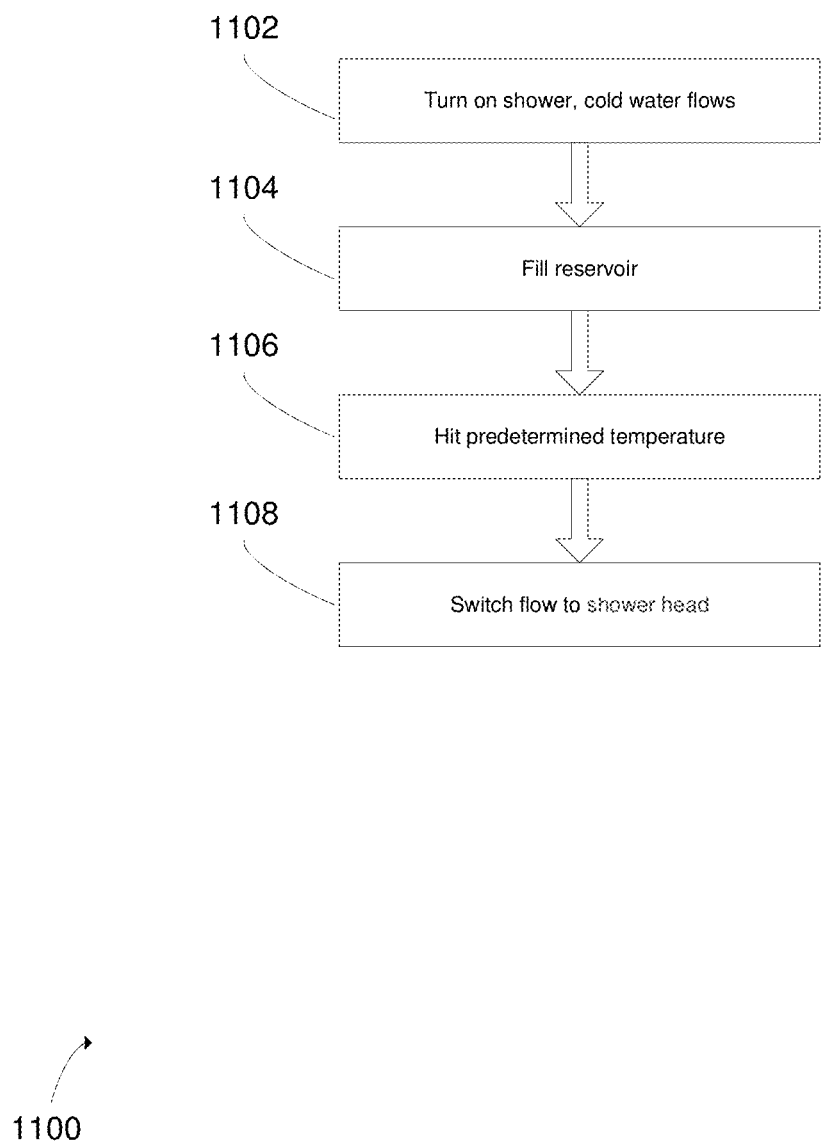
FIG. 11 illustrates an exemplary flow chart illustrating an operation of a shower with a reservoir bag and water saving valve.

Shown in FIG. 11 is an exemplary flow chart 1100 illustrating an operation of a shower with a reservoir bag and water saving valve/diverter. First, the shower is turned on and cold water flows in step 1102. Cold water flows initially because the water has not been heated to an acceptable temperature yet, or because hot water has not flowed through plumbing from a water heater or hot water storage tank. The water saving valve diverts water from the water source to the reservoir, and thus the reservoir bag begins to fill in step 1104. The water saving valve can be purely mechanical or can have electrical components. The water flowing through the valve reaches a predetermined threshold temperature (e.g., 88 degrees Fahrenheit) in step 1106. The temperature be illustrated visually, prompting a person to change the valve, via a reactive powder or other temperature sensing device or can be detected electronically, whereupon the system flips the valve automatically. In step 1108, the water saving valve switches the water flow from the reservoir bag to the shower head. In this manner, cold water that would have been otherwise wasted can be maintained for later reuse.

Figure 12:
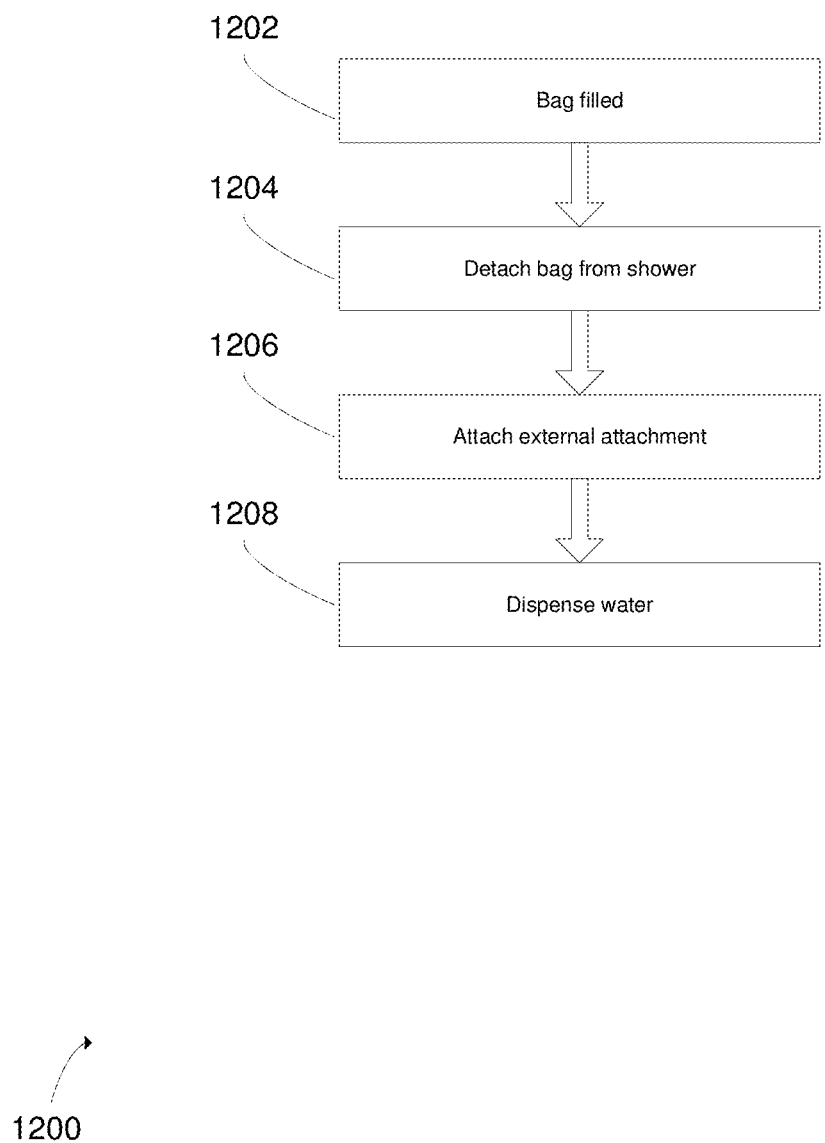
FIG. 12 illustrates an exemplary flow chart illustrating an operation of a reservoir bag and with a water dispensing attachment.

Shown in FIG. 12 is an exemplary flow chart 1200 illustrating an operation of a reservoir bag and with a water dispensing attachment (e.g., outdoor shower, drinking spigot, water transfer attachment, or plant watering attachment). The water reservoir bag is first filled in a shower in step 1202. After, the water reservoir bag is detached from the shower in step 1204. Afterwards, a separate attachment is attached to the reservoir bag in step 1206. Water within the water reservoir bag is then dispensed through the water dispensing attachment in step 1208. The water dispensing attachment can be fabricated onto the water reservoir bag or provided as a removable attachment.

It should be understood that the described water dispensing attachments are merely exemplary. Any number or type of water dispensing attachment can be used. It should further be understood that the description of the water reservoir bag is merely exemplary and is not restricted to shape or class of receptacle (e.g., a bag, semi-rigid, or rigid container), or the materials used to make the receptacle (e.g., plastic, nylon, glass, metal, or other material). The water reservoir bag can be any type of device that retains water.

Figure 13:
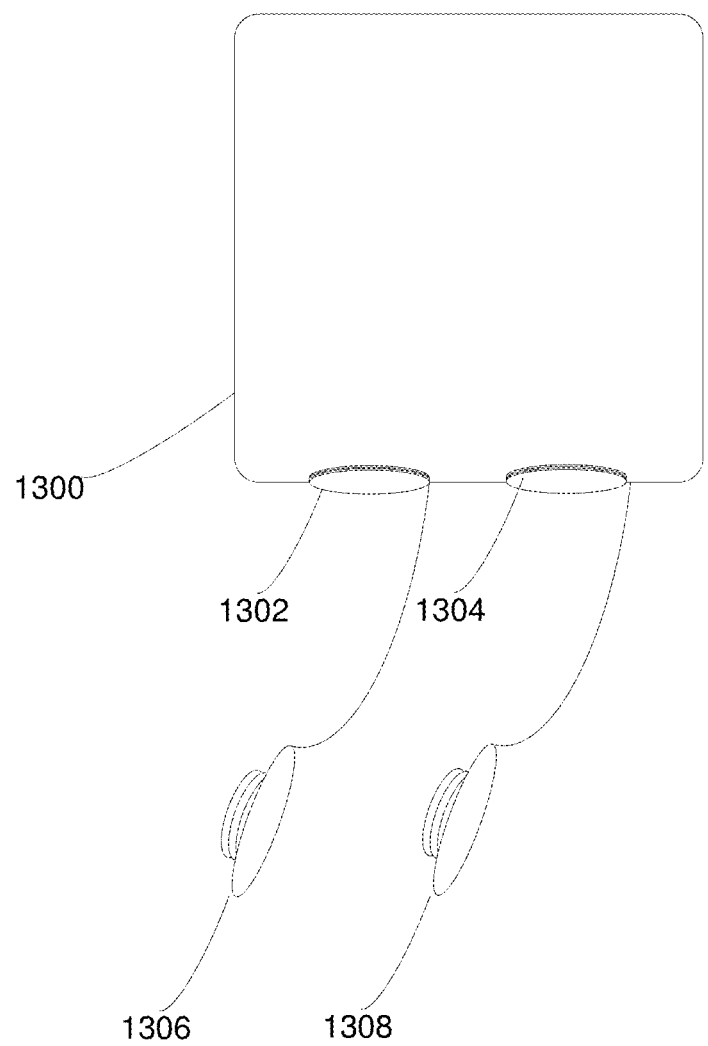
FIG. 13 illustrates an exemplary reservoir bag having multiple openings.

It should be understood that the water reservoir bag can have any number of openings. Shown in FIG. 13 is an exemplary reservoir bag 1300 having first opening 1302 and a second opening 1304. Both the first opening 1302 and second opening 1304 allow water to flow to and from the reservoir bag 1300. The first opening 1302 connects to a flow diverter, such as the flow diverter shown in FIG. 3. The first opening 1302 can be screwed on, snapped on, or any other known method of attachment to attach the reservoir bag 1300 to a shower. The first opening 1302 can also have a screw-able cap 1306 to provide a seal when the reservoir bag 1300 is detached from a flow diverter. In an embodiment, the first opening 1302 can have a snap-able cap. In yet another embodiment, the first opening 1302 seals itself whenever it is detached from the a flow diverter.

Like the first opening 1302, the second opening 1304 is likewise attachable to other components. Any type of attachment can be attached to the first and second openings.

In one embodiment, a reservoir bag 1300 multiple openings 1302/1304 is used in a shower with multiple showerheads. In this embodiment, each showerhead has its own diverter, which diverts water into a shared reservoir bag 1300 though one of the openings 1302/1304 while water entering the diverter is less than a predetermined temperature.

In another embodiment, the a diverter is removably attached (directly or indirectly) to the reservoir bag 1300 through a first opening 1302, and a water dispensing attachment (e.g., outdoor shower, drinking spigot, water transfer attachment, or plant watering attachment) removably attached (directly or indirectly) to the second opening 1304.

Like the first opening 1302, the second opening 1304 is likewise seal-able. In an embodiment, the second opening 1304 has a screw-able cap 1308 to provide a seal when the reservoir bag 1300 is being filled with water or has water. In an embodiment, the second opening 1304 can have a snap-able cap. In yet another embodiment, the second opening 1304 seals itself whenever it is detached from other attachments.

While the reservoir bag has been shown in context of a shower, it should be understood that the reservoir bag can be used in any instance where a person causes cold water to flow through a plumbing while waiting for desired hot water to flow through the fixture. The reservoir bag can be used in any plumbing fixture, such as a shower head, faucet, or sink. It should be further understood that the reservoir bag can be fixably attached to plumbing to recirculate cold water back into the plumbing system.

Although shown in context of a bag, it should be understood that the reservoir can be any type of receptacle. Furthermore, although many openings have been illustrated as being threaded for screwable attachment (such as standard pipe thread found in many home plumbing applications), it should be understood that any of these attachable portions can be snappable, adhesively attached, or known method of attachment.

Many components have been described simply. It should be understood that any number of pipes, hoses, washers, valves can be used in the plumbing systems described herein. It should be understood that the disclosure is not restricted to any singular configuration.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. A system comprising:
    a plumbing fixture;
    a valve that is configured to be coupled to the plumbing fixture, the valve having at least one input to receive water into the valve and two outputs that allow water to selectively flow from the valve;
    a temperature sensor, the temperature sensor being configured to sense a temperature of water flowing through the valve, the temperature sensor being configured to automatically switch between the two outputs on the valve depending on a predetermined temperature of the water flowing through the valve; and
    a reservoir that is configured to be removably coupled to the valve via an ingress opening in the reservoir, the reservoir being configured to receive water from the valve through the ingress opening, wherein the valve is further configured to selectably switch flow to the plumbing fixture or to the reservoir, wherein the reservoir is removably detachable from the valve, and wherein the reservoir comprises a cap attached to the reservoir, the cap providing a seal for the reservoir when the reservoir is removably detached from the valve.

2. The system of claim 1 wherein the plumbing fixture is a shower head.

3. The system of claim 1 wherein the temperature sensor provides a visual indication when the predetermined temperature has been reached.

4. The system of claim 1 wherein the reservoir is further configured to be removably attachable to a water drinking spigot, plant watering, or water transfer attachment.

5. A system, comprising:
    a water reservoir having an opening that is configured to be removably attachable to an output of a valve to receive water, the valve having at least one input to receive water and two outputs that allow water to flow, the water reservoir being configured to be removably attachable to a removably attachable water dispensing component to dispense the received water, wherein the reservoir is removably detachable from the valve, and wherein the reservoir comprises a cap attached to the reservoir, the cap providing a seal for the reservoir when the reservoir is removably detached from the valve, wherein the valve has a temperature sensor that senses when a temperature of water flowing through the valve has risen above a certain temperature, the temperature sensor being configured to automatically switch between the two outputs depending on the certain temperature of the water flowing through the valve.

6. The system of claim 5, wherein the valve is further configured to be manually actuated to switch flow to one or more of its outputs.

7. The system of claim 6, wherein the temperature sensor provides a visual indication when the certain temperature has been reached.

8. The system of claim 5, wherein the temperature sensor provides a visual indication of temperature flowing through the valve.

9. The system of claim 5, wherein the attachable water dispensing component comprises a shower, water drinking spigot, plant watering, or water transfer attachment.

10. The system of claim 5, wherein the removable water reservoir is configured to be attachable to an RV vehicle, wherein the attachable water dispensing component connects to the RV vehicle's water storage tank.

11. A system, comprising:
    a temperature sensitive valve that is attachable to a removably attachable water reservoir, the removably attachable reservoir comprises a cap attached to the removably attachable reservoir, the cap providing a seal for the removably attachable reservoir when the removably attachable reservoir is removably detached from the temperature sensitive valve, the valve having at least one input to receive water and two outputs that allow water to selectively flow, where a removably attachable water reservoir is removably attached to one output to receive and store water, the removably attachable water reservoir being configured to be removably attachable to an attachable water dispensing component to dispense the received water, wherein the valve has a temperature sensor that senses a temperature of water flowing through the valve, the temperature sensor being configured to automatically switch between the two outputs depending on a predetermined temperature of the water flowing through the valve.

12. The system of claim 11, wherein the valve is configured to automatically direct the flow of water from the input to the first output when the water temperature is below a predetermined threshold and direct the flow of water from the input to the second output when the water temperature is above a predetermined threshold.

13. The system of claim 11, wherein the valve is further configured to be manually actuated to direct the flow of water from the input to the first output in a first manual setting and direct water from the input to the second output in a second manual setting.

14. The system of claim 13, wherein the temperature sensor provides a visual indication when the certain temperature has been reached.

15. The system of claim 11, wherein the temperature sensor provides a visual indication of temperature flowing through the valve.

16. The system of claim 11, wherein the attachable water dispensing component comprises a shower, water drinking spigot, plant water, or water transfer attachment.

17. The system of claim 11, wherein the water reservoir is attachable to an RV vehicle, wherein the attachable water dispensing component connects to the RV vehicle's water storage tank.

* * * * *